(12) United States Patent
Kawakami et al.

(10) Patent No.: US 6,950,423 B2
(45) Date of Patent: Sep. 27, 2005

(54) PACKET TRANSMISSION METHOD, PACKET TRANSMISSION DEVICE, RADIO FRAME TRANSMISSION METHOD, MOBILE COMMUNICATION METHOD, MOBILE COMMUNICATION SYSTEM, AND EXCHANGE

(75) Inventors: Hiroshi Kawakami, Yokosuka (JP); Motoshi Tamura, Yokosuka (JP); Takaaki Sato, Yokosuka (JP)

(73) Assignee: NTT Mobile Communications Newtork, Inc., Tokyo (JP)

( * ) Notice: Subject to any disclaimer, the term of this patent is extended or adjusted under 35 U.S.C. 154(b) by 77 days.

(21) Appl. No.: 09/308,072

(22) PCT Filed: Sep. 11, 1998

(86) PCT No.: PCT/JP98/04111

§ 371 (c)(1),
(2), (4) Date: Jul. 19, 1999

(87) PCT Pub. No.: WO99/14905

PCT Pub. Date: Mar. 25, 1999

(65) Prior Publication Data

US 2003/0156569 A1 Aug. 21, 2003

(30) Foreign Application Priority Data

Sep. 16, 1997 (JP) .............................. 9-250946

(51) Int. Cl.[7] .............................. H04J 3/06; H04J 3/00; H04B 7/212; H04L 12/43

(52) U.S. Cl. ...................... 370/350; 370/443; 370/458; 370/337; 370/347

(58) Field of Search ................................ 370/310–350, 370/465, 468, 451, 442–443, 458–459, 394

(56) References Cited

U.S. PATENT DOCUMENTS 5,012,469 A * 4/1991 Sardana ...................... 370/322
5,109,378 A    4/1992 Proctor et al.

(Continued)

FOREIGN PATENT DOCUMENTS

| GB | 2234884 A | 2/1991 | ............ H04M/3/36 |
| JP | 3-53653 | 3/1991 | |
| JP | 4-207733 A | 7/1992 | |
| JP | 5-111014 A | 4/1993 | |

(Continued)

OTHER PUBLICATIONS

Lee, CDMA Systems Engineering Handbook, 1998, Artech House,341–342,430,714–715.*

(Continued)

*Primary Examiner*—Chi Pham
*Assistant Examiner*—Ronald Abelson
(74) *Attorney, Agent, or Firm*—Brinks Hofer Gilson & Lione

(57) ABSTRACT

When packet sending and receiving apparatus 21 sets a connection, timing control apparatus 22 generates a timing information Tf as the packet is dispersed equivalently. Timing control apparatus 22 notices the timing information Tf to packet sending and receiving apparatus 21 and base station 3. Packet sending and receiving apparatus 21 carries out a packet generating processing in accordance with a frame offset value which is indicated by the timing information Tf. Therefore, the packets in which a packet transmission timing is averaged in a packet transmission period arrives to packet multiplex apparatus 23. Consequently, it is possible to decrease a waiting time of the packet multiplex transmission. Therefore, it is possible to use efficiency a transmission link L1, while being satisfied the required service quality.

20 Claims, 10 Drawing Sheets

U.S. PATENT DOCUMENTS

| | | | | |
|---|---|---|---|---|
| 5,228,029 A | * | 7/1993 | Kotzin | 370/331 |
| 5,648,967 A | * | 7/1997 | Schulz | 370/328 |
| 5,652,748 A | * | 7/1997 | Jolma et al. | 370/320 |
| 5,668,807 A | * | 9/1997 | Shachar et al. | 370/378 |
| 5,742,592 A | * | 4/1998 | Scholefield et al. | 370/329 |
| 5,748,624 A | | 5/1998 | Kondo | 370/347 |
| 5,822,725 A | * | 10/1998 | Komatsu et al. | 704/226 |
| 6,067,292 A | * | 5/2000 | Huang et al. | 370/342 |
| 6,122,512 A | * | 9/2000 | Bodin | 455/440 |
| 6,148,209 A | * | 11/2000 | Hamalainen et al. | 455/450 |
| 6,320,856 B1 | * | 11/2001 | Deschaine et al. | 370/337 |
| 6,324,172 B1 | * | 11/2001 | Pankaj | 370/342 |

FOREIGN PATENT DOCUMENTS

| | | |
|---|---|---|
| JP | 6-261064 A | 9/1994 |
| JP | 8-204673 | 8/1996 |
| JP | 8-237275 A | 9/1996 |
| JP | 9-008819 A | 1/1997 |
| JP | WO 097/17779 | 5/1997 |
| JP | 10-023032 A | 1/1998 |
| JP | 10-233784 A | 9/1998 |

OTHER PUBLICATIONS

Sadayuki Yasuda et al., "Study on Method of Constructing Low–Cost ATM Voice Communication Device by AAL–2", 1997 Commutation Society Conversation of IEICE, Aug. 13, 1997, IEICE, B–6–19.

Hiroshi Kawakami et al., "ATM Access Control Method Realizing IMT–2000 Mobile Multimedia", IEICE Technical Report SSE98–6, Apr. 23, 1998.

Supplementary European Search Report, EP 98941843, Dec. 9, 2004.

J. Meierhofer et al., *Medium Access Control For Wireless Extensions of ATM Networks*, Global Telecommunications Conferece, 1996.

* cited by examiner

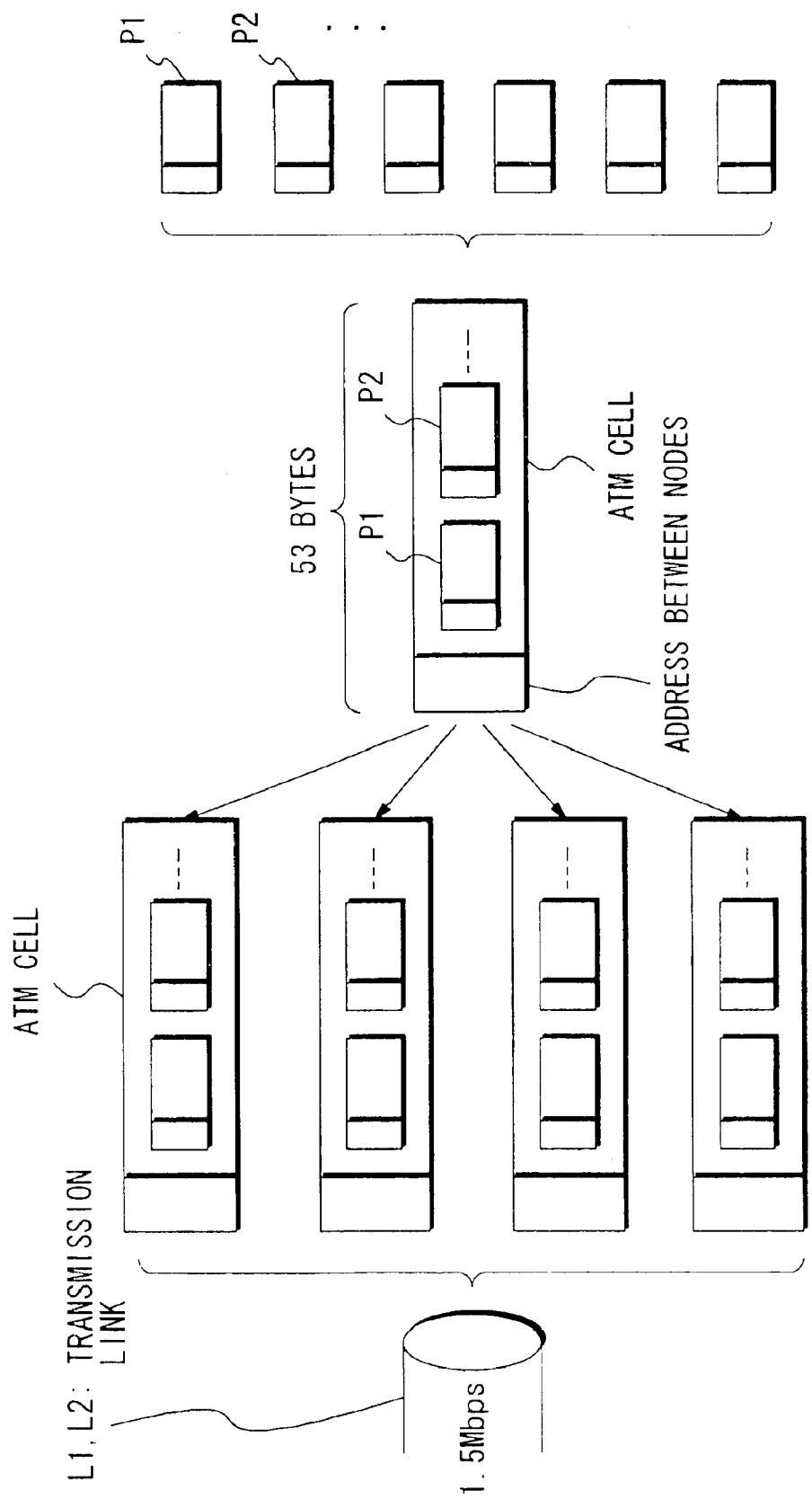

PACKET TRANSMISSION METHOD, PACKET TRANSMISSION DEVICE, RADIO FRAME TRANSMISSION METHOD, MOBILE COMMUNICATION METHOD, MOBILE COMMUNICATION SYSTEM, AND EXCHANGE

TECHNICAL FIELD

This invention relates to a packet transmission method, a packet transmission device, a radio frame transmission method, a mobile communication method, a mobile communication system and a switching center, which are suitably employed to multiplex a packet consisting of plural connections to a transmission link that a plurality of connections use in common.

BACKGROUND ART

In data communication, a conventionally known packet transmission method is available for multiplexing and transmitting the data packets from a plurality of connections to a transmission link employed in common by the plurality of connections. Control is carried out as follows in a conventional packet transmission method. First, detection is performed to determine whether or not the transmission link has a vacant bandwidth. Next, if the transmission link has a vacant bandwidth, the packet is transmitted directly. If, however, the data link does not have a vacant bandwidth due to transmission of other packets with connections, packet transmission enters a waiting state until the transmission link becomes vacant. If the pattern for generating packets for each connection is random, and the connection number is sufficiently high, then the probability of a packet collision during multiplex transmission is averaged by this packet transmission method. Therefore, the average value is used for collision probability, and a transmission link that provides some degree of margin is prepared. In this way, a decline in service, such as increased delays, does not occur substantially, even if a transmission link for the transmission band that added the maximum rate which is offered to all the connections is not prepared.

Thus, it is possible to reduce costs since the transmission service provider can design facilities anticipating a statistical multiplexing effect. The following two points are prerequisites in a facilities design that anticipates such statistical multiplexing effect.
1) The delay condition of the target service shall be comparatively loose to an extent which does not impair the quality of service, even if the packets are made to wait for a moment in a packet multiplex transmitter.
2) The traffic characteristics of a packet which is supplied into the packet multiplex transmitter are average, and burst traffic does not occur.

However, data having strict delay conditions, or data that is cyclically generated is sometimes transmitted in data communication.

As an example of a strict delay condition, a service may be cited in which the delay of transmission data is acknowledged without modification by the user as a time lag, as in the case of image data in voice communication or in a video conference system.

Transmission of high efficiency coded data is available as an example of data having cyclical origin characteristics. The side which is transmitting this coded data converts the user's voice or moving image information into data of fixed or variable length by compressing. The transferred data is then transmitted cyclically or intermittently at a predetermined interval. The receiving side expands the user's voice or moving image information in its continuous, original form on the basis of the received coded data.

As another example of data having cyclical origin characteristics, there is communication through a radio link. In a radio transmission, radio frames are constituted cyclically in the radio link, and data is stored into a radio frame and transmitted. In this case, a communication from a user is carried out with this radio frame period. Therefore, the sending and receiving timing for data at the terminal of the radio link depends on the radio frame period.

For example, in the PDC system employed in digital mobile communication in Japan, the radio frame is formed at every 40 msec interval by combining 6 channels of time slots having a capacity of 280 bits. A super radio frame is formed by combining 18 of the radio frames. The super radio frame has a 720 msec period. In this radio frame design, two time slots are assigned to user communication in V-SELP (Vector Sum Excited Liner Prediction) voice data communication, while one time slot is assigned to user communication in PSI-CELP (Pith Synchronous Innovation CELP) voice data communication. Therefore, the voice communication data of these users usually originates at an integer timing of 20 msec or 40 msec.

As in the case of the examples mentioned above, data exists which has strict delay conditions, or which occurs cyclically. In particular, when a plurality of datum compete in a low speed transmission path, the amount of delay while awaiting transmission becomes serious. Thus, a facilities design which incorporates the statistical multiplexing effect described above cannot be applied to data communication of the aforementioned characteristics.

For the first example, an explanation will now be made of the case where ATM cell multiplex transmission is employed between a mobile communication base station and switching center, and cyclic data having strict delay conditions, such as voice data, is transmitted.

Mobile communication systems generally have extensive communication area. Thus, a mobile communication system arranges base stations that cover radio access to a region of a constant area. The mobile communication system connects these base stations and a switching center with a transmission link, and adopts a design in which the communication data from these base stations is exchanged and summarized. The transmission link speed between the base station and the switching center is influenced by the amount of traffic at the base station. However, in the case where voice communication predominates, the transmission link speed may become a low speed like 1.5 Mbps.

ATM cell multiplex transmission is sometimes applied to the transmission link between this base station and the switching center. In this case, the ATM cell multiplex transmission waiting delay in the ATM cell multiplex transmission portion has a large impact on the service quality as compared to a fixed network. The reason is as follows. First, ATM transmission in a fixed network sets 155 Mbps the basis. Because of this, in the ATM cell multiplex transmission portion, the transmission waiting time of one ATM cell is about 0.0027 msec. However, the delay becomes about 0.27 msec for transmitting the same single ATM cell in a 1.5 Mbps network. In other words, a delay quantity of about 100 times that of the fixed network occurs in the service because the multiplex transmission link is a low speed in mobile communication. In the case where N ATM cells compete in the ATM cell multiplex transmission portion, then a N-fold waiting time occurs. Thus, delay becomes an even more serious problem.

Therefore, when multiplex transmitting data having strict delay conditions at a specified quality by employing ATM cell multiplex transmission in the low-speed transmission link provided between the base station and the switching center, an approach is required which restricts the number of input connections, even if there is additional coverage in the band of the whole multiplex transmission path. As a result, a problem arises in that the statistical multiplexing cannot be sufficiently utilized.

The preceding example employed the case where data is multiplexed in ATM cell units. In contrast to this, a method is known for the efficient forwarding of data having a low transmission rate. In this method, the data is transmitted by multiplexing a AAL Type2 CPS Packet, in which a plurality of connections are mounted on one ATM cell, to one ATM virtual channel (VC). However, when this AAL Type2 CPS Packet is multiplexed to one VC of the ATM, a problem similar to that discussed in the preceding example occurs.

Next, the problem of the burst arrival of data in the terminal of the radio link will be discussed for the second example.

In a design in which ATM multiplex transmission is carried out between a mobile station and a base station which are connected by a radio link, a plurality of mobile stations transmit data to the base station. In this case, the timing for data receipt at the base station depends on the radio frame transmission timing between the mobile station and the base station. Therefore, in the case where each radio frame of each connection used by the plurality of mobile stations during communication is synchronously managed with the same timing, then the base station receives the data from all the mobile stations in a burst at the same timing. Therefore, the ATM cell also arrives at the base station's ATM multiplex transmitter in a burst at the same timing, so that the waiting delay described in the first example increases. Thus, in order to carry out multiplex transmission while satisfying quality, an approach is required in which the number of input connections is restricted, even if there is additional coverage in the band of the whole multiplex transmission path. As a result, a problem arises in that it is not possible to sufficiently utilize the statistical multiplexing effect.

DISCLOSURE OF INVENTION

The present invention has been accomplished in view of the above situation. Given the conventional art's difficulty in providing a facility design incorporating a statistical multiplexing effect, it is therefore an object of the present invention to enable an efficient equipment design for a transmission service having strict delay conditions or periodicity in the data origin.

Furthermore, in an aspect of the present invention, there is provided a packet transmission method which multiplexes each packet from a plurality of connections and transmits the multiplexed packet to a transmission link; wherein said packet transmission method comprising the steps of: determining the packet processing timing of said connection so as to equalize the connection number which is assigned to each timing that divides the packet period, when the connection is set prior to the transmission of said packet, and transmitting the packet of said connection in accordance with said packet processing timing.

Furthermore, in an aspect of the present invention, there is provided a packet transmission apparatus for multiplexing each packet from a plurality of connections and transmitting the multiplexed packet to a transmission link; wherein said packet transmission apparatus comprising: timing control means for determining the packet processing timing of said connection to equalize the connection number which is assigned to each timing that divides a packet period, when the connection is set prior to the transmission of said packet, and transmission means for transmitting the packet of said connection in accordance with said packet processing timing.

Furthermore, in an aspect of the present invention, there is provided a radio frame transmission method for transmitting each data frame from a plurality of connections by using a radio frame which is composed from a plurality of time slots; wherein said radio frame transmission method comprising the steps of: determining the data processing timing of said data frame so as to equally assign the head position of said each data frame to each time slot which constitutes said radio frame, when said connection is set, and transmitting said radio frame which is generated in accordance with said data processing timing.

Furthermore, in an aspect of the present invention, there is provided a mobile communication method which is used in a mobile communication system which comprises a plurality of mobile stations, a base station which is connected to said each mobile station through a radio link, and a switching center which is connected to said base station through a transmission link; wherein said mobile communication method comprising the steps of: determining the packet processing of said connection so as to equalize the connection number which is assigned to each timing that divides the packet period, when the connection is set between said switching center and said mobile station, and transmitting the packet of said connection in accordance with said packet processing between said switching center and said base station.

Furthermore, it is desirable that a forward data frame from said each connection is transmitted from said base station to said mobile station by using a forward radio frame which is constituted from a plurality of time slots, said mobile communication method further comprising the steps of: determining said processing of said forward data frame to equally assign the head position of said forward data frame from said each connection to each time slot which constitutes said radio frame, on the basis of said packet processing, and transmitting said forward radio frame which is generated in accordance with said data processing.

Furthermore, it is desirable that said base station notifies said data processing to said mobile station prior to the transmission of said forward radio frame, on the basis of said data processing timing which is notified, said mobile station detects said head position of said forward data frame out of said forward radio frame, on the basis of said data processing timing which is notified, and said mobile station transmits a reverse radio frame which sets said head position of said reverse data frame, on the basis of the receiving timing of said forward data frame.

Furthermore, in an aspect of the present invention, there is provided a mobile communication system which comprises a plurality of mobile stations, a base station which is connected to said each mobile station through a radio link, and a switching center which is connected to said base station through a transmission link, said mobile communication system transmitting a forward data frame from said base station to said mobile station by using a forward radio frame which is constituted from a plurality of time slots, wherein said mobile communication system comprising: packet timing control means for determining a packet processing timing of said connection so as to equalize the connection number which is assigned to each timing that divides a packet period, when the connection is set between said switching center and said mobile station, packet transmission means for transmitting a packet of said connection in accordance with said packet processing timing between said switching center and said base station, radio frame timing control means for respectively setting a processing timing of said forward data frame so as to equally assign the head position of said forward data frame corresponding to said each connection to each time slot which constitutes said radio frame, on the basis of said packet processing timing, and a radio frame transmission means for transmitting said forward radio frame which is generated in accordance with said processing timing.

Furthermore, in an aspect of the present invention, there is provided a switching center which is used in a mobile communication system which comprises a plurality of mobile stations, and a base station which is connected to said each mobile station through a radio link, the switching center carrying out packet transmission with said base station, wherein: said switching center comprising packet timing control means for determining a packet processing timing of said connection so as to equalize the connection number which is assigned to each timing that divides a packet period, when the connection is set between said switching center and said mobile station, and packet transmission means for transmitting a packet of said connection in accordance with said packet processing timing between said switching center and said base station.

BRIEF DESCRIPTION OF DRAWINGS

FIG. 12 is a conceptual diagram showing the processing flow in the case where an AAL Type2 CPS Packet is multiplexed and transmitted to the ATM cell in a modified embodiment.

BEST MODE FOR CARRYING OUT THE INVENTION

The best mode for carrying out the present invention when employing ATM transmission in a mobile communication system will now be described.

1. Construction of Embodiment

Figure 1:
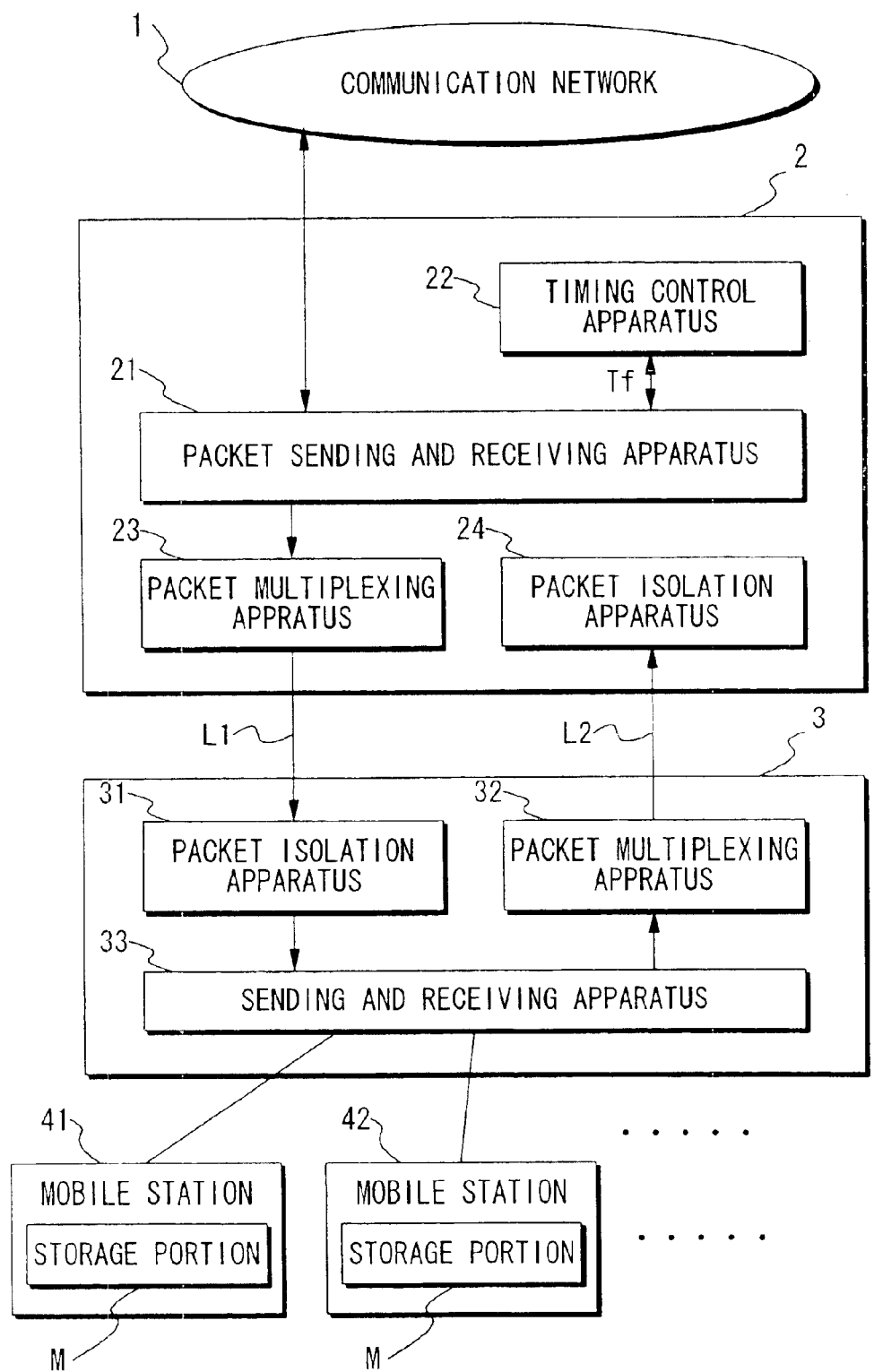
FIG. 1 is a block diagram showing the constitution of a mobile communication system in a preferred embodiment in this invention.
Figure 2:
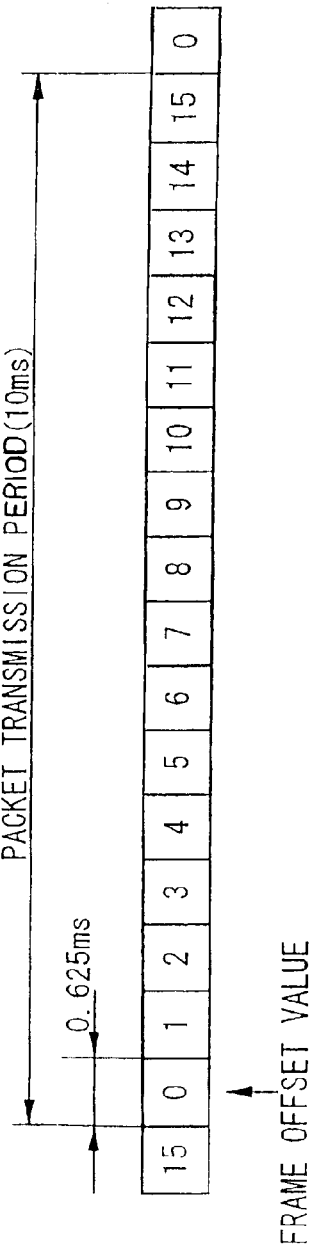
FIG. 2 is a conceptual diagram showing an example of the frame construction which is used with transmission links L1, L2 in the same preferred embodiment.

FIG. 1 is a block diagram showing the constitution of the mobile communication system in a preferred embodiment of this invention. In FIG. 1, the mobile communication system comprises a communication network 1, such as a transit network or a fixed telephone network, a switching center 2 which carries out communication between communication network 1 and itself, a base station 3 which manages a plurality of cells, transmission links L1, L2 for carrying out packet communication between switching center 2 and base station 3, and a plurality of mobile stations 41, 42, ... which communicate with base station 3. Various types of methods such as the frame relay transmission method can be applied for transmission link L1, L2. Transmission link L1, L2 in this embodiment transmits the data stored to a packet by using the ATM transmission method. Transmission link L1 is the forward transmission path, and is used in data transmission from switching center 2 to base station 3. On the other hand, transmission link L2 is the reverse transmission path, and is used for data transmission from base station 3 to switching center 2. An example of the packet transmission period that is used with transmission link L1, L2, is shown in FIG. 2. As shown in this figure, the packet transmission period consists of a timing that is divided in 16 units, for example.

Next, switching center 2 is constructed as follows. 21 is a packet sending and receiving apparatus that carries out sending and receiving processing. Packet sending and receiving apparatus 21 sets up a connection when the setting request for a connection occurs from communication network 1 and each mobile station 41, 42 . . . Also, packet sending and receiving apparatus 21 carries out packet generation processing on the received data from communication network 1, and generates a packet with the specified timing described below.

The numeral 22 indicates a timing control apparatus that is connected to packet sending and receiving apparatus 21. When packet sending and receiving apparatus 21 sets up the connection, timing control apparatus 22 notifies timing information Tf to packet sending and receiving apparatus 21 and base station 3. Timing information Tf expresses a timing in which the packet transmission period is divided by a certain natural number. For example, as shown in FIG. 2, if the packet transmission period is divided by 16, then a number between 0 and 15 in the figure is the timing information Tf. In this example, each of the timings for dividing the packet transmission period is called the "frame offset value." Timing control unit 22 generates timing information Tf so that the packet is dispersed uniformly within the packet transmission period. Two examples are explained as embodiments. First, the $1^{st}$ mode is a method for randomly generating timing information Tf in the order of the connection setting request. When this method is adopted, if the packet transmission period is divided into N parts (where N is a natural number greater than 2), timing control apparatus 22 sets up the frame offset value such as $0 \rightarrow 1 \rightarrow 2 \ldots \rightarrow N-1$ as timing information Tf in the order of the connection setting request. When the N+1th connection setting request occurs, timing control apparatus 22 returns the frame offset value to 0 again, and sets up timing information Tf as that the frame offset value cycles the value from 0 to N−1.

Figure 3:
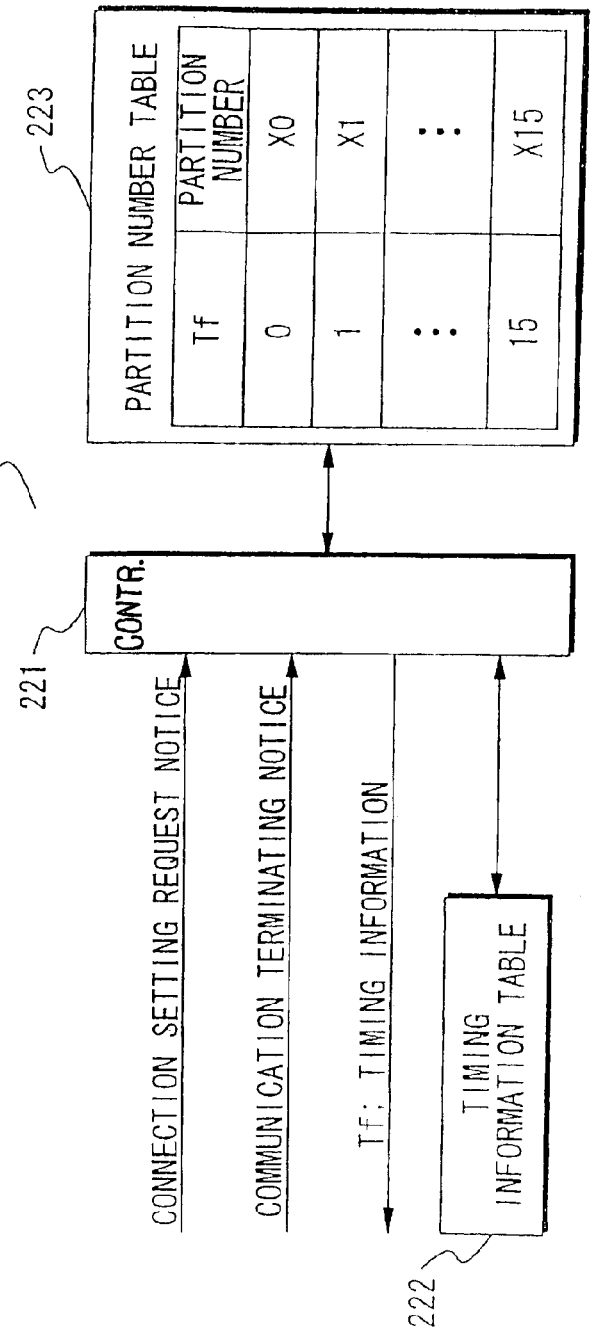
FIG. 3 is a block diagram showing a constitution example of a timing control apparatus in preferred embodiment.

Next, in the 2nd mode, the connection number during communication is detected at every frame offset value, and the frame offset value having the lowest connection number is assigned as timing information when a new connection setting request occurs. An example of the constitution of a timing control apparatus 22 using this method is shown in FIG. 3. Timing control apparatus 22 of this example controls the whole apparatus. Timing control apparatus 22 consists of control unit 221 which is constructed of a CPU, ROM, RAM and the like, timing information table 222 which is connected to control unit 221, and partition number table 223.

Timing information table 222 consists of a storage medium such as a random access memory. Timing information Tf is associated with the identification number for identifying each connection during communication, and is stored in timing information table 222. Control unit 221 writes timing information Tf, which is associated with the identification number, into timing information table 222 when a connection setting request notice is received. Thus, it is possible to know which timing information Tf is being used in communication by referring to timing information table 222 at the time of communication termination.

Next, partition number table 223 consists of a storage medium such as a random access memory. The connection number that is currently being assigned to each frame offset value of timing information Tf is stored in partition number table 223.

In the above-described constitution, control unit 221 accesses partition number table 223 when a new connection setting request notice is received. Control unit 221 sets up the a frame offset value in which the partition number is the lowest as timing information Tf. Thereafter, control unit 221 writes timing information Tf in timing information table 222. At this time, control unit 221 associates timing information Tf with the identification number of the requested connection, i.e., the telephone number of the mobile station, for example. Control unit 221 renews the partition number of partition number table 223, by increasing by one the partition number of partition number table 223 associated with timing information Tf.

On the other hand, control unit 221 that has received a communication termination notice obtains timing information Tf corresponding to the identification number of the requested connection, by accessing timing information table 222. After that, control unit 221 renews the partition number of partition number table 223 by decreasing the partition number of partition number table 223 associated with timing information Tf by one. Thereafter, control unit 221 deletes the identification number and timing information Tf at which communication terminated from timing information table 222. Then, a connection setting request notice and communication termination notice are generated by packet sending and receiving apparatus 21 and sent to timing control apparatus 22.

In this way, timing control apparatus 22 can generate the frame offset value which has a minimum partition number as timing information Tf, in correspondence with a situation in which communication changes from moment to moment. Packet sending and receiving apparatus 21 carries out transmission processing at the timing which indicates the frame offset value on the basis of timing information Tf which is notified at every connection. The packet generation processing that generates data such as a high efficiency coding speech information and non-speech information, and packets the generated data, is also carried out at a timing which meets the transmission time and so that the delay time is minimized.

Next, packet multiplexing apparatus 23 shown in FIG. 1 multiplexes the packet from packet sending and receiving apparatus 21 and outputs it to transmission link L1. In this case, if the packet arrives at packet multiplexing apparatus 23 all at once, then a long waiting time for transmission is required because the transmission speed of transmission link L1 is constant. However, as mentioned above, since packet sending and receiving apparatus 21 carries out transmission processing on the basis of timing information Tf, the packet transmission timing is equilibrated in the packet transmission period. Therefore, it is possible to decrease the delay during packet multiplex transmission, and improve transmission path use efficiency while satisfying the required service quality.

Next, 24 is a packet isolation apparatus. Packet isolation apparatus 24 isolates the multiplexed packet that is transmitted through transmission link L2 from base station 3 via every each connection, and transmits it to packet sending and receiving apparatus 21. Base station 3 is constituted as follows. 31 is a packet isolation apparatus which isolates the packet transmitted from switching center 2 via every each connection. 32 is a sending and receiving apparatus which communicates among each mobile station 41, 42, . . . The aforementioned timing control apparatus 22 notifies timing information Tf to sending and receiving apparatus 32. Timing information Tf is stored during the period that the connection is established in a storage portion that is provided in sending and receiving apparatus 32. 33 is a packet multiplexing apparatus which multiplexes each packet which is transmitted from sending and receiving apparatus 33, and outputs the multiplexed packet to transmission link L2.

According to the aforementioned constitution, when the packet that was transmitted from switching center 2 is isolated in correspondence to each connection by packet isolation apparatus 31, sending and receiving apparatus 32 converts the isolated packet to a radio frame. Thereafter, sending and receiving apparatus 32 transmits the radio frame to each mobile station 41, 42 . . . with the timing that complies with the frame offset value which is shown by timing information Tf that was notified at the time of connection setting.

Figure 4:
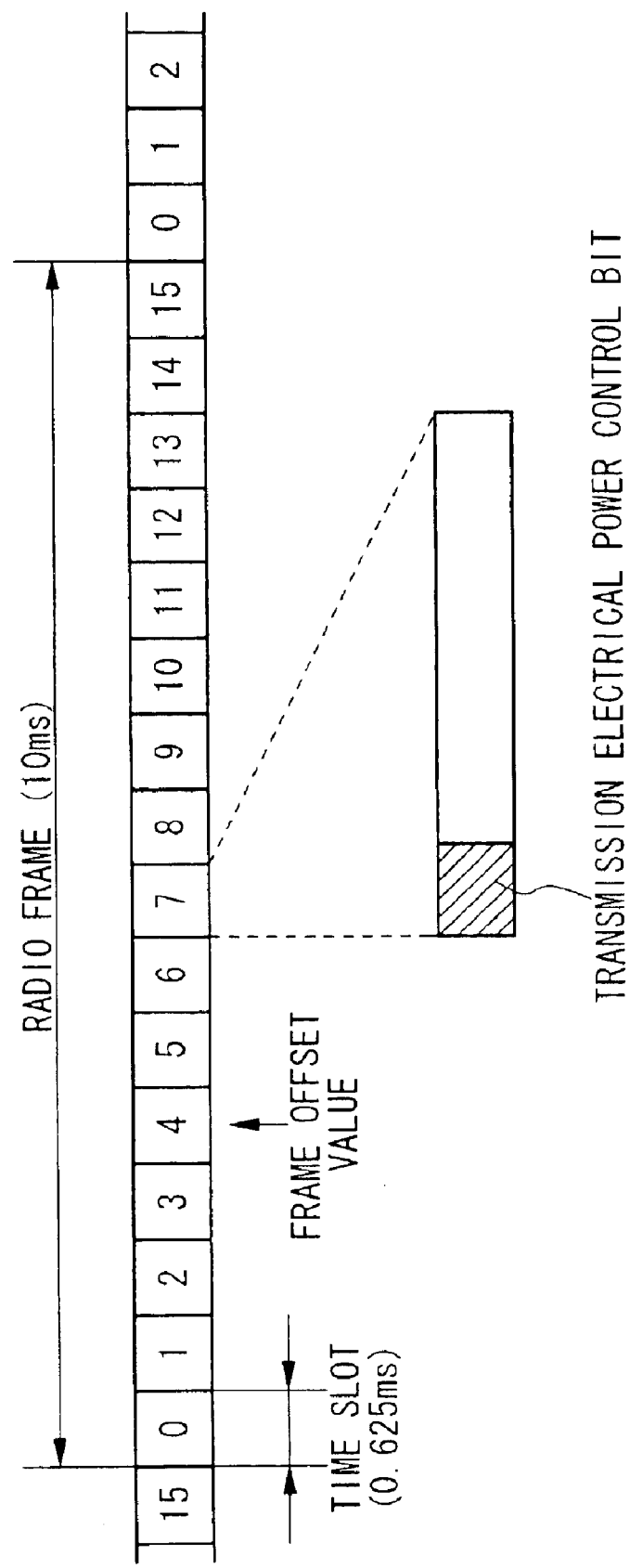
FIG. 4 is a conceptual diagram showing the physical radio frame in the same preferred embodiment.

FIG. 4 is a conceptual diagram showing the physical constitution of the radio frame which is transmitted from base station 3 to each mobile station 41, 42 . . . . As shown in FIG. 4, the physical radio frame in the radio section is divided into 16 time slots. Base station 3 uniformly assigns the header of user data, such as a voice, to each of 16 divided time slots. Thus, mobile stations 41,42 . . . can receive the user data at a timing which has been equilibrated in the radio frame. Mobile stations 41,42 . . . transmit a reverse radio frame in accordance with the timing for receiving the user data. The bit array of the obtained radio channel is divided into the above 16 time slots. In this case, the starting position of the time slot is detected by recognizing the pilot signal bit that is inserted at the head of each time slot.

Note that in this example, a CDMA radio method is adopted in the mobile communication. In the CDMA radio method, the user information is diffused by multiplying a diffusion signal having a wide bandwidth and high frequency and a particular code pattern for every the radio channel, and is transmitted it to a receiving side. The receiving side obtains the bit string of the requested radio channel by using a particular code pattern. In general, a difference in the reception level at each receiving side occurs in proportion to the distance from a base station and a mobile station. The difference in the reception levels causes degeneration in communication quality and capacity in the CDMA radio method. In order to solve these problems, high accuracy transmission electrical power control accompanying level variation must be performed. Time slot constitution is generally adopted in the CDMA radio method as the unit for carrying out transmission electrical power control accompanying instantaneous variation.

Figure 5:
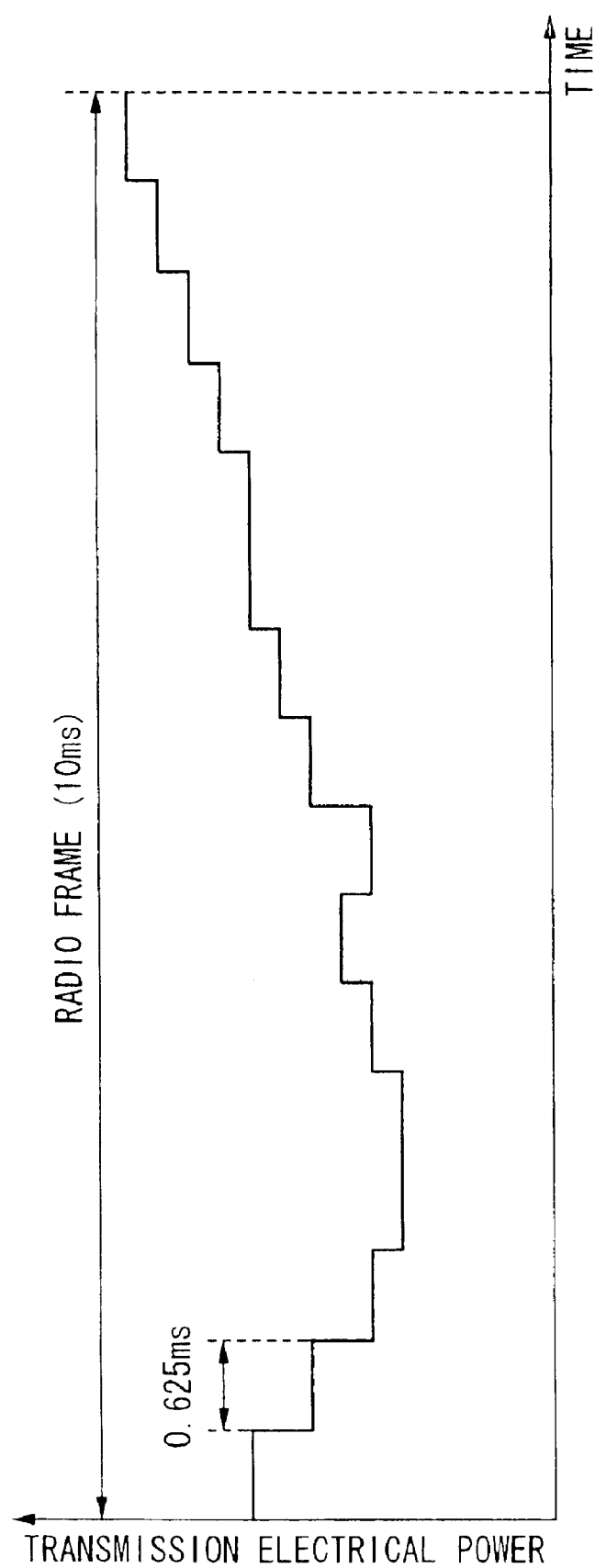
FIG. 5 is a time chart showing an example of the transmission power control in the same preferred embodiment.

Since the objectives differ, it is not absolutely essential that the time slot constitution for carrying out transmission electrical power control and the time slot constitution for transmitting the aforementioned user data be the same. However, if each time slot is composed independently, then it is necessary to detect the time slots separately, making timing control more complex. Therefore, each of the time slot constitutions in this embodiment are made to coincide. Specifically, as shown in FIG. 4, a transmission electrical power control bit is inserted for every time slot. It is possible to increase and decrease transmission electrical power in units of 0.625 msec in this example. FIG. 5 is a time chart showing an example of transmission power control carried out in time slot units.

Thus, the unit of each time slot is made to correspond with the transmission electrical power control unit of the CDMA radio method. Therefore, it is not necessary to newly add a complicated slot constitution to the radio frame in this embodiment. The head position of the logical radio frame (the data frame) that is constructed logically for every connection is set to the slot that is shifted only by the indicated frame offset value. As a result, sending and receiving apparatus 32 of base station 3 can set up transmission timing for the connection, without changing the transmission timing of the physical radio frame. As mentioned above, the frame offset value indicated by timing information Tf is set so that the partition number is uniform within the packet transmission period. Therefore, in the radio frame transmission which is carried out among base station 3 and each mobile station 41,42 . . . , the head position of each logical radio frame in each connection is assigned equally to each time slot of the physical radio frame which is used in common by a plurality of connections.

Figure 6:
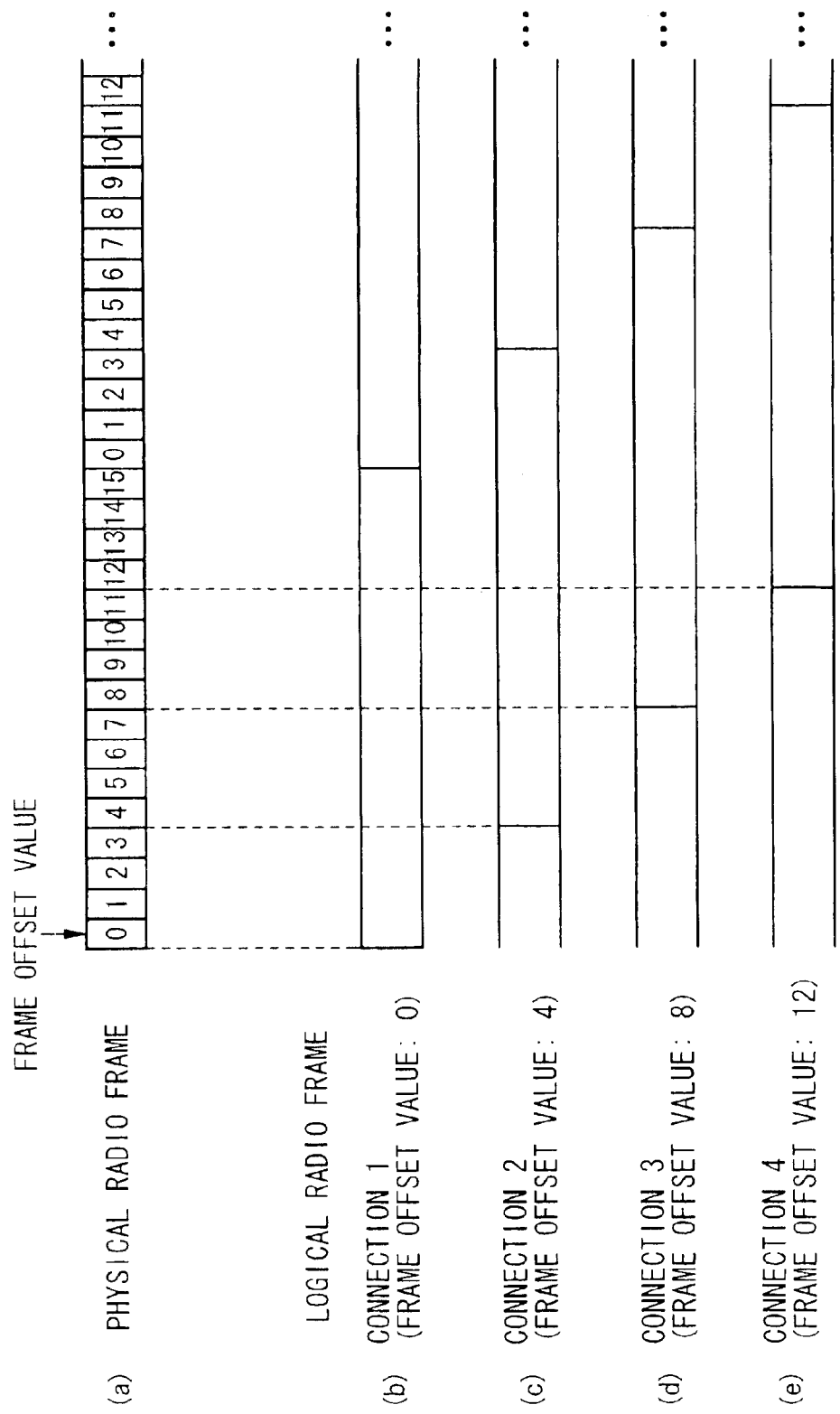
FIG. 6 is a timing chart showing an example of the relationship between the physical radio frame and the logical radio frame for each connection in the same preferred embodiment.

For example, if the frame offset value of connection 1 is zero, the frame offset value of connection 2 is four, the frame offset value of connection 3 is eight, and the frame offset value of connection 4 is twelve, the physical constitution of the radio frame and the logical constitution of the radio frame in each connection becomes as shown in FIG. 6. FIG. 6(*a*) shows the physical radio frame, and FIG. 6(*b*)–(*e*) show the logical radio frame of connections 1–4.

Figure 7:
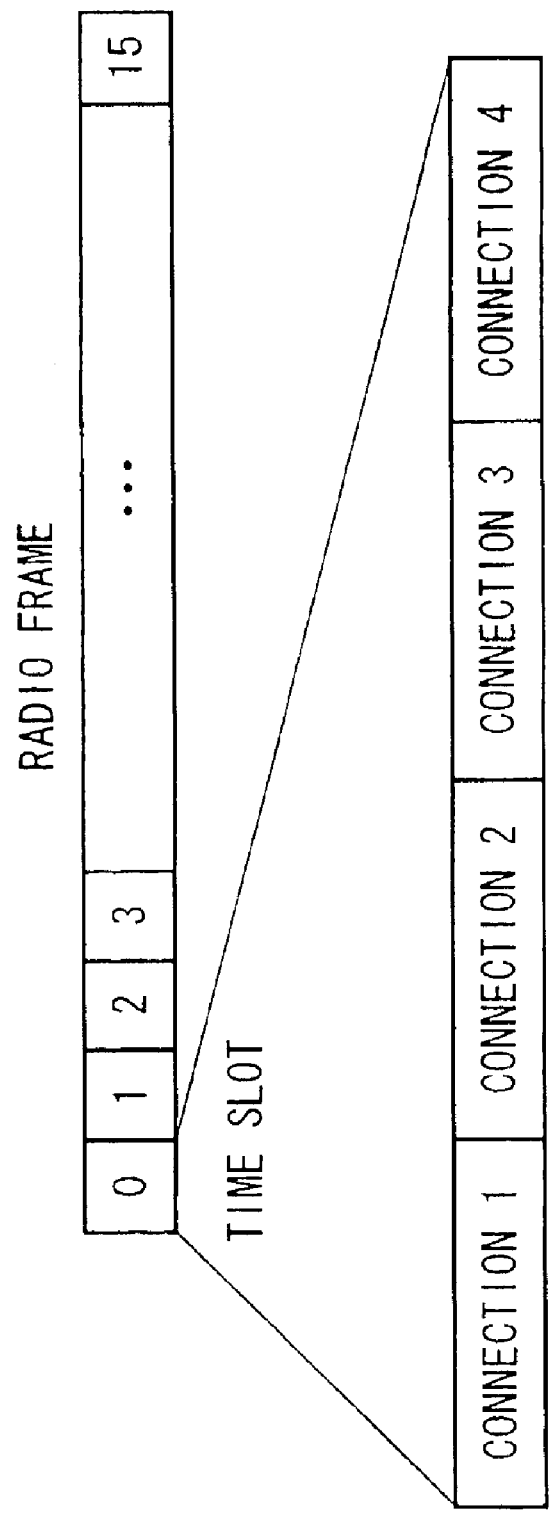
FIG. 7 is a conceptual diagram showing an example of a radio frame which has a TDM (Time Division Multiplex) construction that is able to accommodate a plurality of connections in the same preferred embodiment.

The logical radio frame timing corresponding to the connection may be set up irrespective of the transmission timing of the physical radio frame. In this case, a plurality of connections can be accommodated in the slot. For example, in the case where four connections are accommodated in one time slot, the radio frame and the time slot take on the relationship shown in FIG. 7. Thus, even in the case where the radio frame has a TDM constitution which can accommodate a plurality of connections, it is possible to communicate without carrying out complicated resource management or suffering a decline in capacity due to division loss by the radio resource at the time of transmission timing.

Respective storage portions M are provided in each mobile station 41, 42 . . . . Each mobile station 42,42 . . . is notified of the timing information Tf that is assigned to adjust the timing of the logical radio frame in base station 3 at the time of connection setting. Each notified timing information Tf is written to storage department M of each mobile station 41, 42 . . . . This written timing information Tf is held during the period that the connection is established, and is cleared at the time of communication termination. Each mobile station 41, 42 . . . detects the frame offset value by referring to timing information Tf which is read out from storage department M when the radio frame which is transmitted from base station 2 is received. Each mobile station 41, 42 . . . can judge the head position of the logical radio frame corresponding to the connection to the physical radio frame based on the detected frame offset value.

Each mobile station 41, 42 . . . that received the logical radio frame transmits the radio frame to base station 2 in accordance with the timing at which the logical radio frame was received. Base station 3 that received the radio frame assembles the packet from the radio frame, and outputs the packet to packet multiplexing apparatus 33 after modulation and demodulation at sending and receiving apparatus 32. Packet multiplexing apparatus 33 multiplexes the packet of a plurality of connections, and transmits the multiplexed packet to switching center 2 through transmission link L2.

As a result of the aforementioned processing, the timing at which the packet from each mobile station 41, 42 . . . arrives at packet multiplexing apparatus 33 of base station 3 is determined in accordance with logical radio frame transmission timing, i.e., the transmission timing from base station 3 to each mobile station 41, 42 . . . , at forward base station 3. The logical radio frame transmission timing at forward base station 3 is dispersed so that the partition number is made uniform in accordance with timing information Tf. Thus, the packet-input timing to packet multiplexing apparatus 33 in reverse base station 2 is also equilibrated. Therefore, it is possible to improve the usage efficiency of transmission link L2 from reverse base station 3 to switching center 2, by equilibrating the forward logical radio frame timing in base station 3.

2. Operation of Embodiment

The operation of the embodiment will now be described with reference to the drawings.

2-1: Operation of Forward Path

Figure 8:
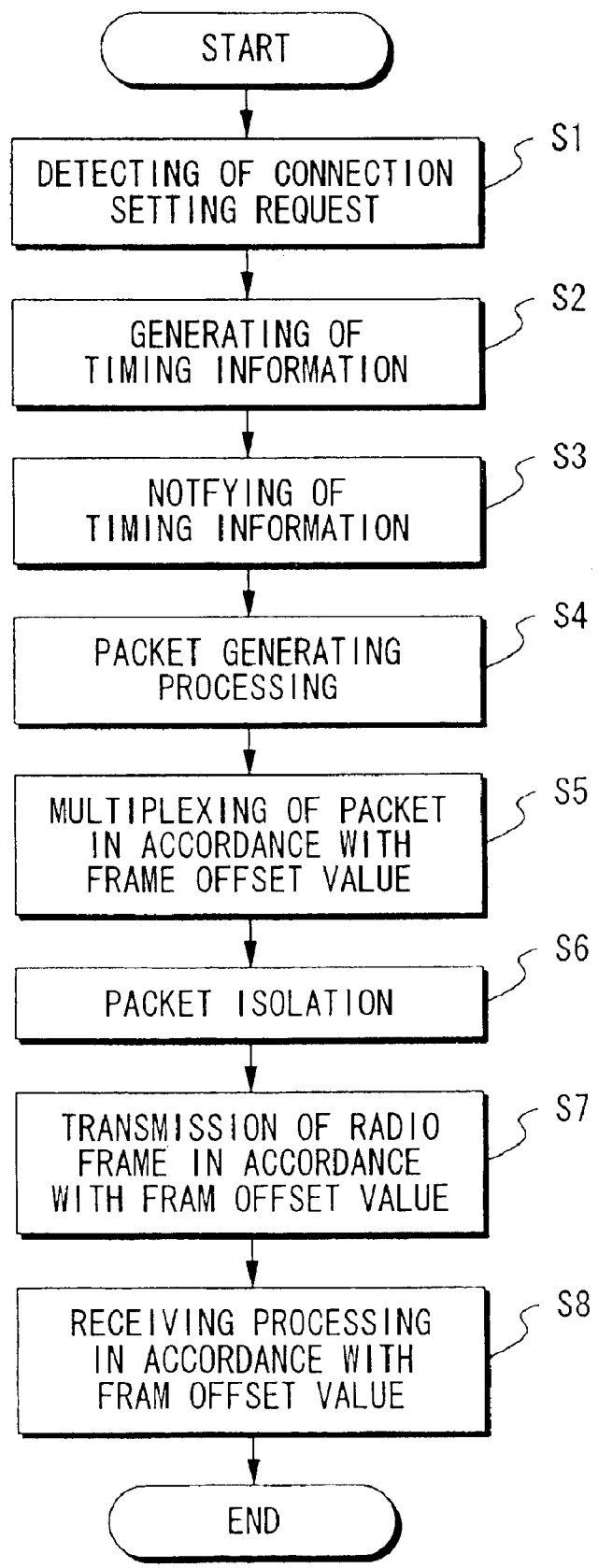
FIG. 8 is a flowchart showing the contents of the forward procedure in the same preferred embodiment.

First, the operation of forward path from switching center 2 to mobile station 41 will be described. FIG. 8 is a flowchart showing the details of the forward path procedure. In FIG. 8, when a connection setting request occurs, timing control apparatus 22 detects the connection setting request (step S1), and carries out the processing to generate timing information Tf (step S2). In this case, control unit 221 of timing control apparatus 21 searches partition number table 223 and generates the frame offset value for which the partition number is a minimum as timing information Tf. For example, if partition number X1~X15 corresponding to offset values 1~15 are all "10" or higher, and partition number X0 corresponding to frame offset value 0 is "9", then timing information Tf indicating offset value 0 is generated.

Receiving apparatus 21 of switching center 2 and sending and receiving apparatus 32 of base station 3 are notified of the generated timing information Tf (step S3), and stored in association with a connection. When timing information Tf is transmitted from sending and receiving apparatus 32 to mobile station 41 through the control channel of the radio frame, mobile station 41 stores received timing information Tf in storage portion M. In this way, it is possible to carry out communication in accordance with the frame offset value that is indicated by timing information Tf, because each node obtains timing information Tf corresponding to the connection.

Next, when packet sending and receiving apparatus 21 carries out packet generation processing in accordance with the frame offset value indicated by timing information Tf, packet multiplexing apparatus 23 multiplexes the packet from each connection and transmits it to transmission link L1 (step S5). As described above, since the frame offset for which the partition number is a minimum is set in timing information Tf, the generating timing of the packet is equalized in the packet transmission period. Therefore, since it is possible to reduce the transmission waiting time, it is possible to transmit data using a transmission link L1 having a comparatively small transmission capacity, even when the data has strict delay conditions, or is generated cyclically.

Next, when base station 3 receives the data that was transmitted through transmission link L1, the multiplexed packet is isolated by packet isolation apparatus 31 (step S6). Thereafter, sending and receiving apparatus 32 converts the isolated packet to the radio frame. In this case, sending and receiving apparatus 32 sets the head location of the logical radio frame to the slot that is shifted by only the frame offset value indicated by the timing information Tf that was notified in step S3. For example, if the frame offset value is "0", the logical radio frame between base station 3 and mobile station 41 becomes the one shown in FIG. 6(b).

When a radio frame that consisted in this way is transmitted in mobile station 41 (step S7), mobile station 41 reads out the timing information Tf that is stored in storage portion M, and detects the slot position at which the logical radio frame starts in accordance with the frame offset value of timing information Tf. Furthermore, mobile station 41 carries out reception processing on the basis of the start position of the detected logical radio frame and obtains data (step S8). However, this reception processing includes processing for receiving the transmission electrical power control bit in the CDMA radio method and setting up transmission electrical power.

2-2. Reverse Processing

Figure 9:
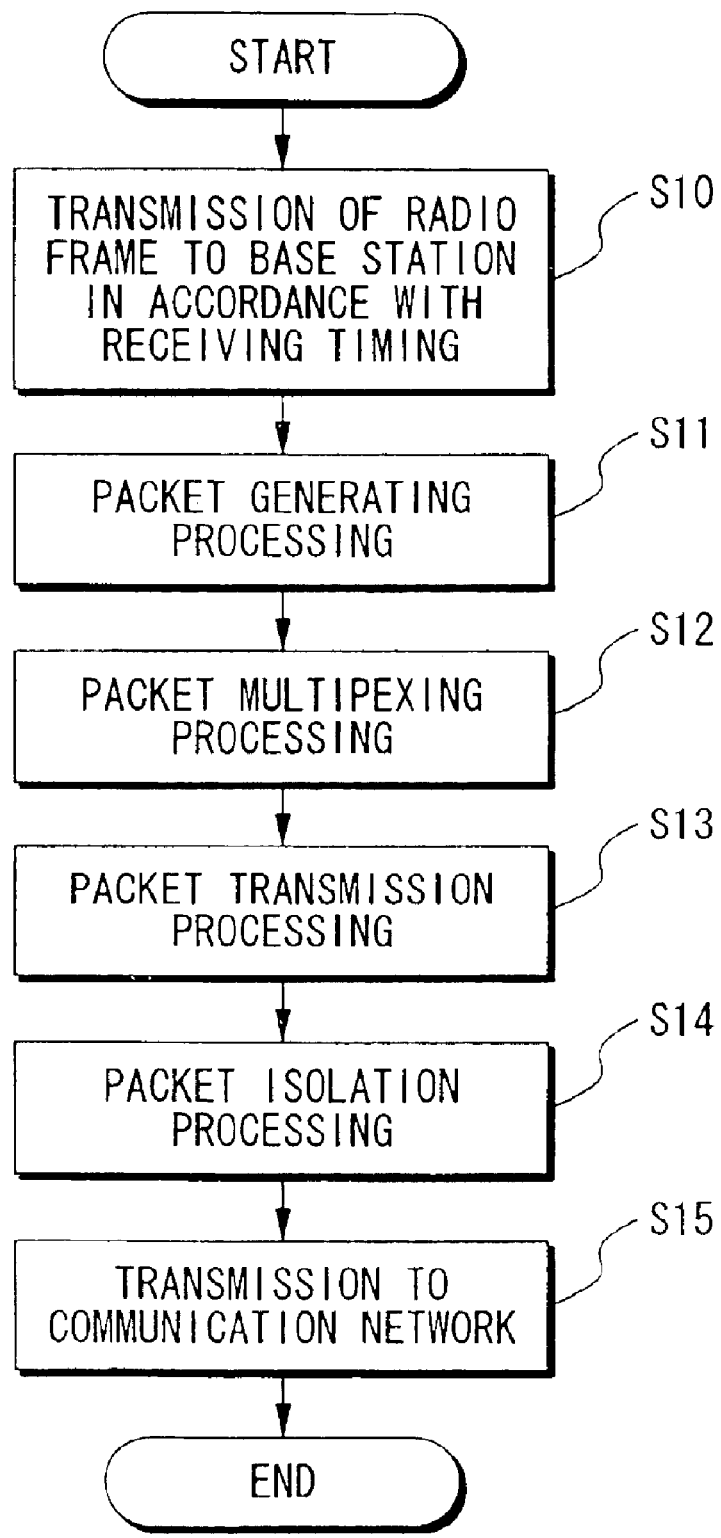
FIG. 9 is a flowchart showing contents of the reverse procedure in the same preferred embodiment.

Next, the processing for the reverse path from mobile station 41 to switching center 2 will be explained. FIG. 9 is a flowchart showing the reverse processing.

In FIG. 9, mobile station 41 transmits the radio frame to base station 3 in accordance with the timing of the logical radio frame that is received in step S8 (step 10) described above. Next, sending and receiving apparatus 32 of base station 3 assembles the radio frame into a packet and outputs the packet to packet interleaving apparatus 33 (step 11). In this case, the timing of the packet that arrives at packet interleaving apparatus 33 depends on the timing of the logical radio frame received by base station 3. Thus, many packets do not compete.

Thereafter, the plurality of packets are multiplexed by packet interleaving apparatus 33 (step 12) and transmitted to switching center 2 through transmission link L2 (step 13). Next, when the multiplexed packet arrives at switching center 2 through transmission link L2, packet isolation apparatus 24 isolates the multiplexed packet for each connection (step 14). Then, packet sending and receiving apparatus 21 performs a specified conversion processing on the packaged data, and transmits it to communication network 1.

In this way, the timing of the reverse logical radio frame is adjusted in accordance with the receiving timing of the logical radio frame of mobile station 41 in reverse processing. The packet input timing in packet interleaving apparatus 33 is also equalized in accordance with this adjustment. However, it is also acceptable to consciously equalize timing by notifying timing information to sending and receiving apparatus 32 and packet sending and receiving apparatus 21 even in reverse processing. Therefore, it is possible to improve the usage efficiency of transmission link L2 from reverse base station 3 to switching center 2, by equalizing the forward logical radio frame timing in base station 3.

3. Result of Simulation

Next, this inventor et al carried out computer simulation to confirm the effect of the aforementioned mobile communication system. In this simulation, the transmission path speed was 1.5 Mbps, packet length was 15 octet fixation, packet transmission period was 10 msec, and packet generation probability was 50% in an ATM transmission method (AAL Type2) that can multiplex a packet that consists of a plurality of connections to an ATM cell. Furthermore, a comparison was made between the case where the packet is transmitted with random timing in a packet period, and the case where the transmission timing of the communication connection is cyclically assigned by dividing the transmission timing into 1–16 parts in the packet transmission period.

Figure 10:
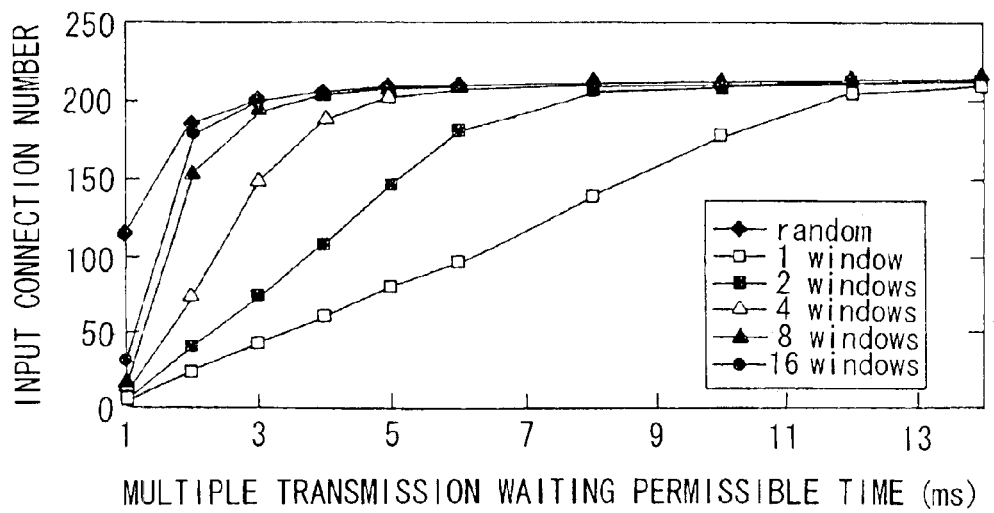
FIG. 10 is a polygonal line graph showing the results of simulations performed in the same preferred embodiment.

FIG. 10 is a conceptual diagram showing the simulation results. In FIG. 10, the vertical axis is a maximum input connection number that satisfies a $1 \times 10^{-4}$ packet discard rate and the horizontal axis is the permissible time for awaiting multiplex transmission in packet interleaving apparatus 23. Based on the results of this simulation, when the transmission timing of each packet is the same (1window), then the transmission path cannot accommodate a sufficient connection number if the permissible waiting delay for multiplex transmission waiting is not equal to or greater than about 12 msec.

On the other hand, when the connection is uniformly assigned by dividing the packet transmission timing into 8 (8 windows) or 16 (16 windows) in the packet transmission period, then the transmission path can accommodate a sufficient connection number when the multiplex transmission waiting time is about 3–5 msec.

Figure 11:
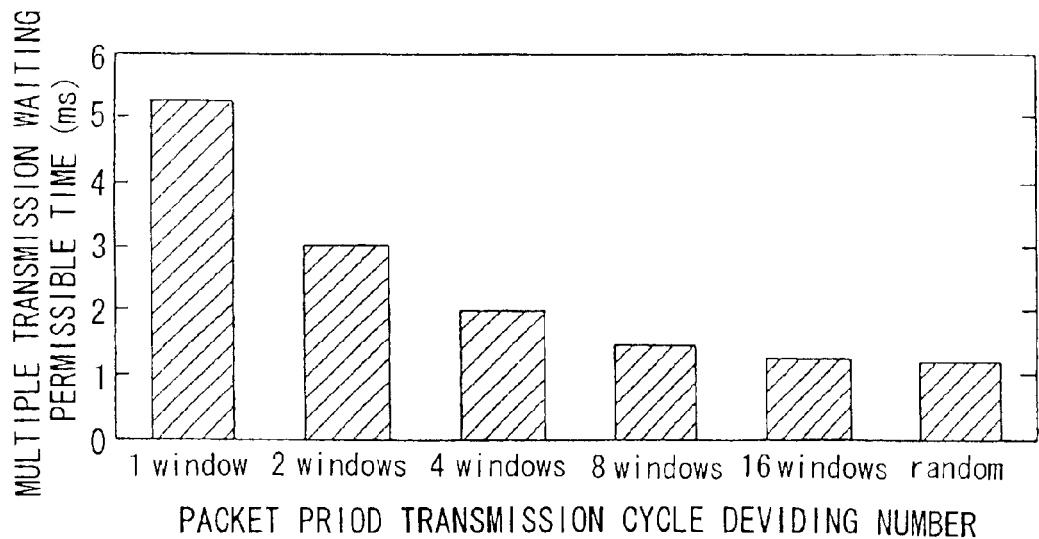
FIG. 11 is a bar chart showing an example of the average multiplex transmission waiting time for a packet in the same preferred embodiment.

FIG. 11 shows the results of simulations of the average multiplex transmission waiting time of the packet in the case where the input connection number to packet interleaving apparatus 23 is 200 and the permissible multiples transmission waiting time is infinite. From the results of this simulation, it is clear that the multiplex transmission waiting time decreases substantially as the division number of the packet transmission period increases. In particular, if the division number is set to 16, then it is possible to transmit data at a waiting time which is almost equivalent to the case where the packet transmission timing is random. From these results, it is clear that the aforementioned mobile communication system is effective for communication in a service that demands real time processing.

4. Conclusion

As described above, in this embodiment, transmission timing is divided into N timings in the packet transmission timing period. In addition, the timing which was divided into N parts at the time of connection setting is selected so that the packet arriving at packet interleaving apparatus 23 is equalized. Thus, it is possible to reduce data bursts among a plurality of connections in data transmission in which there is periodicity in data generation or which has strict delay conditions. Therefore, it is possible to demonstrate a statistical multiplexing effect. In this way, it is possible to use the transmission link efficiently, while meeting quality requirements.

If the logical radio frame timing for each connection between each mobile station 41,42 . . . and base station 3 is set independent of the physical radio frame transmission timing for base station 3, then it is possible to equalize the radio frame transmission timing without assigning a radio capacity resource for each timing, even in the case of a radio frame that has a TDM constitution. The packet arrival timing is also equalized even in reverse packet interleaving apparatus 23 of base station 3 in the mobile communication system. Therefore, it is possible to obtain a high transmission path usage efficiency with a short delay time, and to design efficient equipment.

Furthermore, in this embodiment, the load of the apparatus that processes and summarizes a plurality of connections is reduced in switching center 2 and base station 3 because the timing at which the data occurs in a plurality of connections is dispersed. Apparatuses that process and summarize a plurality of connections correspond to a high speed switch disposed in exchange 2 or a hand over control apparatus that controls hand over, for example.

5. Modified Embodiment

Embodiments according to the present invention were explained above. However, this invention is not restricted thereto, but rather, a variety of modifications as discussed below are possible.

(i) In the preceding embodiment, the same value does not need to be employed for the timing information Tf that is set in packet sending and receiving apparatus 22 of switching center 2, and the timing information Tf that is set in sending and receiving apparatus 32 of base station 3. Rather, it is sufficient that there be a constant relationship between timing information Tf of receiving apparatus 22 and timing information Tf of receiving apparatus 32. For example, timing information Tf that is set in sending and receiving apparatus 32 may be shifted with timing information Tf that is set in packet sending and receiving apparatus 22, after taking into consideration transmission delay between switching center 2 and base station 3, the processing delay of each apparatus, the fluctuation time of the ATM cell and the like. In this way, it is possible to reduce excessive delay time since it is possible to set the frame offset value after considering each type of delay time.

(ii) In the preceding embodiment, timing control apparatus 22 of switching center 2 notifies sending and receiving apparatus 22 of base station 3 of timing information Tf. However, it is also acceptable to transmit timing information Tf using the control channel of transmission link L1, or using a control line (not shown) which connects switching center 2 and base station 3.

(iii) In the preceding embodiment, the timing control apparatus 22 is provided in switching center 2. However, the invention is not restricted to this arrangement. Rather, timing control apparatus 22 may be provided anywhere in base station 3, for example. Provided that it is possible to notify packet sending and receiving apparatus 21 of switching center 2 and sending and receiving apparatus 32 of base station 3 of the timing information Tf which is generated at the time of the connection setting, then the location of timing control apparatus 22 is not restricted.

(iv) In the preceding embodiment, the reverse data processing timing was processed at the timing at which each mobile station 41, 42 . . . receives the radio frame. In this case, it is also acceptable that the radio frame which is sent from each mobile station 41, 42 . . . to base station 3 be delayed by only a constant time, ½ time slot for example, with respect to the received radio frame. As a result, it is possible to reduce control errors by setting the transmission electrical power control delay in CDMA radio method to one time slot.

(v) In the preceding embodiment, transmission links L1, L2 which are used in a mobile communication system were explained as an example of the packet communication system. However, the invention is not restricted thereto. Namely, transmission links L1, L2 may be applied to a general packet communication system. For example, transmission links L1, L2 may be applied to a communication network which uses the transmission link having a transmission rate of 155 Mbps. In this case, the waiting time does not become a significant problem because the transmission link is high speed. Rather, the waiting time in the switch that multiplexes and transmits data to the transmission link becomes a problem. However, in the case where the connection is set in advance, it is possible to reduce the load of each apparatus that makes up the communication network since the processing timing is set to equalize the connection number which is assigned to each timing dividing the packet period.

(vi) In the preceding embodiment, transmission links L1, L2 carry out ATM transmission. However, the transmission packet may also be an AAL Type2 CPS Packet. FIG. 12 is a conceptual diagram showing the flow of processing employing an AAL Type2 CPS Packet. As shown in FIG. 12, a plurality of CPS packets are multiplexed in one ATM cell. Individual user data is stored in each CPS packet P1, P2 . . . Namely, a plurality of connections are multiplexed in one ATM cell. Assuming that one connection is set to one ATM cell, then the waiting time until the data is buried in one ATM cell becomes long since one ATM cell is a long fifty-three bytes. However, there is an advantage in that waiting time decreases more, because a plurality of connections are multiplexed to one ATM cell in this transmission system.

Note that competition in data processing occurs in each apparatus provided in switching center 2 and base station 3 when data arrives from each connection in a burst. What becomes problematic in this case is competition between ATM cells generate when the ATM cell is transmitted to a low speed transmission link. When setting the connection in this embodiment, the connection is assigned to each time slot so that the partition number is equalized. Thus, the ATM cells are generated by dispersing in time. It is therefore possible to transmit ATM cells smoothly even if a low speed transmission link is used.

What is claimed is:

1. A packet transmission method for transmitting packets in a plurality of connections via a first and a second transmission link; wherein packets are transmitted at a plurality of first timings via said first transmission link, and one or more connections may be assigned to each of said plurality of first timings, said first timings are repeated with a first period; and wherein packets are transmitted in said second link by using a frame having a plurality of time slots, each of said first timings corresponds to one of said plurality of time slots, and a time length of said frame is equal to said first period; said packet transmission method comprising the steps of:

a) assigning, to a new connection, one of the first timings to which a least number of connections are assigned, in the event of establishing said new connection via said first and said second transmission links;

b) assigning, to said new connection, a time slot which corresponds to said one of the first timings assigned in step a), in the event of establishing said new connection;

c) transmitting packets of said new connection at said one of the first timings assigned in step a) via said first transmission link; and d) transmitting packets of said new connection via said second transmission link in a way that a head position of each packet are accommodated in the time slot assigned in step b).

2. A packet transmission apparatus for transmitting packets in a plurality of connections via a first and a second transmission link; wherein packets are transmitting at a plurality of first timings via said first transmission link, and one or more connections may be assigned to each of said plurality of first timings, said first timings are repeated with a first period; and wherein packets are transmitting in said second link by using a frame having a plurality of time slots, each of said first timings corresponds to one of said plurality of time slots, and a time length of said frame is equal to said first period; said packet transmission apparatus comprising:
- a) means for assigning, to a new connection, one of the first timings to which a least number of connections are assigned, in the event of establishing said new connection via said first and said second transmission links;
- b) means for assigning, to said new connection, a time slot which corresponds to said one of the first timings assigned by the means a), in the event of establishing said new connection;
- c) means for transmitting packets of said new connection at said one of the first timings assigned by the means a) via said first transmission link; and
- d) means for transmitting packets of said new connection via said second transmission link in a way that a head position of each packet is accommodated in the time slot assigned by the means b).

3. A packet transmission method for transmitting packets in a plurality of connections via a first and a second transmission link, said packet transmission method is used in a mobile communication system which includes a switching center, a base station connected to said switching center via said first transmission link, and a mobile station connected to said base station via said second transmission link; wherein packets are transmitted between said switching center and said base station at a plurality of first timings via said first transmission link, and one and more connections may be assigned to each of said plurality of first timings, and said first timings are repeated with a first period; and wherein packets are transmitted between said base station and said mobile station via said second link by using a frame having a plurality of time slots, each of said first timings corresponds to one of said plurality of time slots, and a time length of said frame is equal to said first period; said packet transmission method comprising the steps of:
- a) said base station assigning, to a new connection, one of the first timings to which a least number of connections are assigned, in the event of establishing said new connection via said first and said second transmission links;
- b) said base station assigning, to said new connection, a time slot which corresponds to said one of the first timings assigned in step a), in the event of establishing said new connection;
- c) transmitting packets of said new connection at said one of the first timings assigned in step a) via said first transmission link; and
- d) transmitting packets of said new connection via said second transmission link in a way that a head position of each packet is accommodated in the time slot assigned in step b).

4. The packet transmission according to claim 3, further comprising the steps of:
- e) said base station notifying said mobile station of said time slots assigned in step b) prior to the transmissions of packets from said mobile station to said base station; and
- f) said mobile station transmitting packets of said new connections to said base station via said second transmission link in a way that the head position of each packet is accommodated in the time slot notified in step e).

5. The packet transmission method according to claim 3, further comprising a step of:
- g) said mobile station transmitting packets of said new connection to said base station via said second transmission link in a way that the head position of each packet is accommodated in the time slot corresponding to the time slot which is used in receiving data packets from said base station.

6. A packet transmission method for transmitting packets in a plurality of connections via a first and a second transmission link, said packet transmission method is used in a mobile communication system which includes a switching center, a base station connected to said switching center via said first transmission link, and a mobile station connected to said base station via said second transmission link, wherein packets are transmitted between said switching center and said base station at a plurality of first timings via said first transmission link, and one and more connections may be assigned to each of said plurality of first timings, and said first timings are repeated with a first period; and wherein packets are transmitted between said base station and said mobile station via said second link by using a frame having a plurality of time slots, each of said first timings corresponds to one of said plurality of time slots, and a time length of said frame is equal to said first period; said packet transmission method comprising the steps of:
- a) said switching center assigning, to a new connection, one of the first timings to which a least number of connections are assigned, in the event of establishing said new connection via said first and second transmission links, and notifying said one of the first timings to said base station;
- b) said base station assigning, to said new connection, a time slot which corresponds to said one of the first timings notified by said switching center in step a), in the event of establishing said new connection;
- c) transmitting packets of said new connection at said one of the first timings assigned in step a) via said first transmission link; and
- d) transmitting packets of said new connection via said second transmission link in a way that a head position of each packet is accommodated in the time slot assigned in step b).

7. A method of packet transmission between a switching center, a base station and a mobile terminal in a mobile communications network, the method comprising:
- a switching center assigning a frame offset in a packet transmission period to a new connection for a mobile terminal in response to receipt of a connection request for the mobile terminal;
- a base station assigning a time slot in a frame to the new connection that corresponds to the frame offset;
- transmitting data at the assigned frame offset in a packet over a first communication link between the switching center and the base station; and
- transmitting the data with the corresponding time slot between the base station and a mobile terminal, wherein a pilot signal is included with the data to indicate a start position of the time slot in the frame.

8. The method of claim 7, wherein assigning the frame offset comprises assigning the frame offset sequential among a predetermined number of available frame offsets.

9. The method of claim 7, wherein assigning the frame offset comprises selecting, from among a plurality of frame offsets, a frame offset that currently has a fewest number of connections for mobile terminals assigned.

10. The method of claim 7, wherein the number of frame offsets in the packet transmission period and the number of timeslots in the frame are equal so that the position of the frame offset in the packet transmission period is equivalent to the position of the time slot in the frame.

11. A packet transmission system for transmitting packets of data between a switching center, a base station and a mobile terminal in a mobile communication system, the packet transmission system comprising:

a switching center configured to receive a connection request for connection of a mobile terminal;

the switching center comprising a timing control apparatus configured to generate timing information for the connection, and a packet sending and receiving apparatus configured to send and receive packets for the connection;

wherein the timing control apparatus is configured to assign a frame offset from within a packet transmission period to the connection and the packet sending and receiving apparatus is configured to transmit a packet for the connection based on the frame offset, the packet transmittable for receipt by a base station; and wherein the frame offset is useable by the base station to convert the packet to a radio frame such that the packet is assigned to a time slot in the frame based on the frame offset.

12. The packet transmission system of claim 11, wherein the timing control apparatus is configured to sequentially assign the frame offset to the connection from among a predetermined number of available frame offsets within the packet transmission period.

13. The packet transmission system of claim 11, wherein the timing control apparatus is configured to select, from among a plurality of frame offsets in the packet transmission period, the frame offset that currently has a fewest number of connections for mobile terminals assigned.

14. The packet transmission system of claim 11, wherein the quantity of frame offsets in the packet transmission period and the quantity of timeslots in the frame are equal so that the position of a frame offset in the packet transmission period is equivalent to the position of a time slot in the frame.

15. The packet transmission system of claim 11, wherein the switching center further comprises a packet multiplexing apparatus that is configured to multiplex the packet for transmission.

16. A packet transmission system for transmitting packets between a switching center, a base station and a mobile terminal in a mobile communication system, the packet transmission system comprising:

a base station that comprises a packet isolation apparatus and a sending and receiving apparatus, wherein the packet isolation apparatus is configured to isolate a packet of data for a connection of a mobile terminal, the packet of data is one of a plurality of packets receivable from a switching center that are uniformly dispersed within a packet transmission period based on frame offset values assigned to a plurality of connections of mobile terminals, wherein the sending and receiving apparatus is configured to convert the isolated packet of data to a time slot in a radio frame, the time slot in the radio frame is assigned based on the frame offset value that is assigned to the connection of the mobile terminal, the sending and receiving apparatus further configured to transmit the radio frame for receipt by a mobile terminal.

17. The packet transmission system of claim 16, wherein the sending and receiving apparatus is configured to store timing information receivable from the switching center, the timing information includes the frame offset value for the connection of the mobile terminal.

18. The packet transmission system of claim 16, wherein a quantity of frame offsets in the packet transmission period and a quantity of time slots in the radio frame are equal so that the position of the frame offset in the packet transmission period is equivalent to the position of the time slot in the radio frame.

19. The packet transmission system of claim 16, wherein the sending and receiving apparatus is configured to include a pilot signal with the packet of data, the pilot signal indicative of a start position of the time slot.

20. The packet transmission system of claim 16, wherein the switching center further comprises a packet multiplexing apparatus that is configured to multiplex the packet of data for transmission.

* * * * *

UNITED STATES PATENT AND TRADEMARK OFFICE
CERTIFICATE OF CORRECTION

PATENT NO. : 6,950,423 B2
DATED : September 27, 2005
INVENTOR(S) : Hiroshi Kawakami et al.

It is certified that error appears in the above-identified patent and that said Letters Patent is hereby corrected as shown below:

Title page,
Item [73], Assignee, change "Newtork," to -- Network --.

Signed and Sealed this

Twenty-fourth Day of January, 2006

JON W. DUDAS
*Director of the United States Patent and Trademark Office*